(No Model.)
A. C. MITCHELL.
MIXER OR BEATER.
No. 466,178. Patented Dec. 29, 1891.
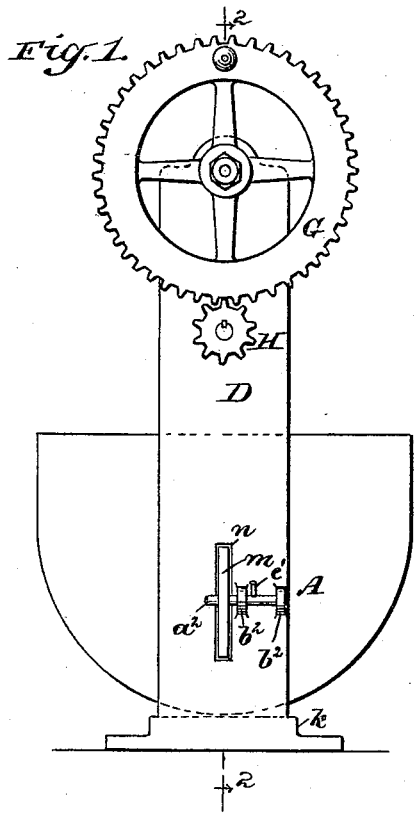
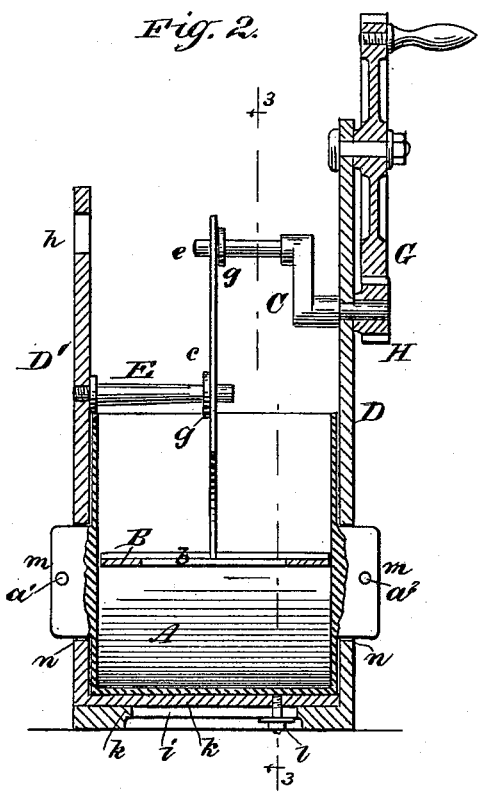
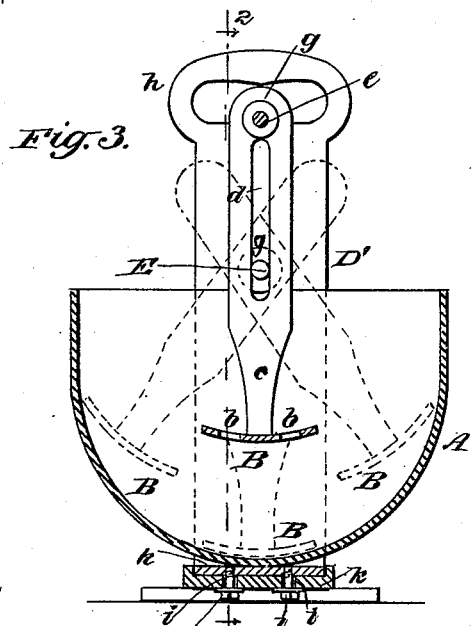
WITNESSES:
J. A. Criswell
C. Sedgwick
INVENTOR
A. C. Mitchell
BY Munn & Co.
ATTORNEYS.

UNITED STATES PATENT OFFICE.

AROBINE C. MITCHELL, OF ENNIS, MONTANA.

MIXER OR BEATER.

SPECIFICATION forming part of Letters Patent No. 466,178, dated December 29, 1891.

Application filed July 7, 1891. Serial No. 398,659. (No model.)

*To all whom it may concern:*

Be it known that I, AROBINE C. MITCHELL, of Ennis, in the county of Madison and State of Montana, have invented a new and useful Improvement in Mixers or Beaters, of which the following is a full, clear, and exact description.

This invention relates to mixing and beating machines, more especially designed to be used on the materials or batter of which cakes and the like are made.

The invention consists in certain novel constructions and combinations of parts in a machine of this description, substantially as hereinafter described, and more particularly pointed out in the claims.

Reference is to be had to the accompanying drawings, forming a part of this specification, in which similar letters of reference indicate corresponding parts in all the figures.

Figure 1 represents a side elevation of the machine; Fig. 2, a vertical section thereof on the line 2 2 in Fig. 1, and Fig. 3 a vertical section upon the line 3 3 in Fig. 2.

A is the basin or bowl of the machine, made with a bottom mainly of semicircular concave form and with opposite flattened sides internally, the sides and ends of the bowl above its concave bottom being, if desired, slightly extended in straight lines upward. This shape of the basin prevents the batter from flying out of it by the rapid motion of the paddle which beats the batter, and it causes the batter to constantly settle to the bottom of the basin, while the paddle, operating as hereinafter described, touches or nearly touches at each stroke the whole semicircular portion of the body or concave bottom of the basin, thus causing the batter to be evenly beaten without any special scraping down.

The paddle B has a reciprocating curvilinear motion, somewhat similar to that of other egg and like beaters; but it differs therefrom in its construction and arrangement of its connections. Thus the paddle itself is in the form of a plate of curvilinear form, corresponding, or thereabout, to the interior curvature of the basin and has any number of apertures $b$ through it. Its length is equal, or thereabout, to the width of the basin between its opposite flattened sides, so that it reaches all across the basin and comes in contact with more of the batter at each stroke than it otherwise would. Said paddle is made to thus sweep over and across the semicircular interior or bottom portion of the basin, in close contiguity thereto, in the one reciprocating half of its travel, and then to move back in the other reciprocating half of its travel in a raised position within the basin, as follows: Projecting upward from the paddle B is a longitudinally-slotted arm $c$, connected at its upper end above the longitudinal slot $d$ with the wrist-pin $e$ of a rotating crank C, that has its bearing in one of the side uprights D of a main frame, while a fulcrum-pin E, connected with the other side upright D' of said frame, projects through the slot $d$ of the paddle-arm $c$, so that upon rotating the crank C the paddle B has the motion hereinbefore described communicated to it. In order that the paddle B may have a rapid motion given it, any suitable speeding-up mechanism is applied to the crank—as, for instance, a spur-wheel G, rotated by a handle and a pinion H on the outer end of the shaft of the crank C, meshing with said wheel. The wheel G is here shown as arranged above the pinion; but it might be arranged to mesh with the pinion from below, if desired. Upon the wrist-pin $e$ of the crank and upon the fulcrum-pin E are fixed washers or flanges $g\ g$, arranged to bear or lie on opposite sides of the paddle-arm $c$ to guide the paddle in its course, and whereby all screws or pins to secure the paddle and its arm in place are dispensed with.

The machine may either be fastened rigidly—as by bolts or clamps, for instance—to a shelf or table or may be held in the lap of a sitting operator, which will be a great convenience to a fatigued person, and to this end the side upright D' of the main frame is constructed or slotted to form a handle $h$, adapted to be held by the one hand to steady the machine by while the other hand is being used to rotate the crank C on the other side of the frame.

The two side uprights D D' of the main frame are independent of each other, and are each provided with a foot-piece $k$, arranged to lie the one under or over the other. The lower one of these foot-pieces is provided with longitudinal slots $i$ for passage of screw-bolts $l$ through it, which bolts engage with tapped holes in the other foot-piece to hold the side uprights D D' at a proper distance apart, at the same time permitting, upon slackening said bolts, of said uprights being adjusted farther apart for a purpose or purposes that will be hereinafter described.

The basin A is held to its place within the main frame by attached blocks or tenons $m\ m$ on its sides, arranged to pass through slots or mortises $n\ n$ in the uprights D D', and the whole secured by locking-pins $a'\ a^2$, passing in a sliding manner through said tenons and through ears $b^2\ b^2$ on each of the uprights D D'. Each of these sliding locking-pins has a projecting screw or knob $c'$ on it between the ears $b^2\ b^2$ to form a handle to operate them by and to admit of their being slid back or unlocked without removing them, thus making sliding bolts of the locking-pins, so that they cannot be misplaced or lost. The general construction of the machine, in fact, so far as its connections are concerned is such that in adjusting it and taking it apart there is not a pin or bur that need be removed or be exposed to being misplaced or lost.

When it is necessary to remove the paddle B with its attached arm $c$, the bolts $l$ are slackened and the locking pin or bolt $a'$ is drawn back, and afterward the main frame held and drawn apart laterally until the tenon $m$, passing through the slot $n$ in the upright D', is slipped out of said slot. If necessary to remove, also, the basin A, then the other locking pin or bolt $a^2$ is slid back from engagement and the basin drawn toward the side upright D' until the other tenon $m$ is slipped out of its slot. This forms a very easy and simple adjustment.

Having thus described my invention, I claim as new and desire to secure by Letters Patent—

1. In mixers or beaters of the character described, the combination of the basin A, substantially of semicircular concave form, with opposite flattened sides internally, the curved apertured plate-like paddle B, arranged to extend across the width of the basin and provided with an upper arm $c$, having a longitudinal slot $d$, the frame of the machine having opposite side uprights, the rotating crank C, carried by one of said uprights, having a wrist-pin adapted to engage with the paddle-arm above its longitudinal slot, speeding-gear for driving said crank, and a fixed fulcrum-pin E, connected with the other of said uprights, adapted to engage with the longitudinal slot in the paddle-arm, substantially as specified.

2. In a mixer or beater, substantially as described, the main frame constructed with opposite side uprights, the one of which is made to form a handle on its upper end, while the other carries a rotating crank adapted to operate the paddle of the mixer, essentially as set forth.

3. In a mixer or beater, substantially as described, the main frame composed of opposite side uprights having slots $n\ n$ in their sides, and attached foot-pieces $k\ k$, capable of being slid and adjusted one over the other to admit of varying the distance apart of said uprights, in combination with the basin A, having tenons $m\ m$ in sliding fit with the slots $n\ n$, the locking-bolts $a'\ a^2$, the paddle B, with its longitudinally-slotted arm $c$, the fulcrum-pin E, connected with the one of said uprights, and the rotating crank C, both for operation in connection with the slotted arms of the paddle, essentially as specified.

4. In a mixer or beater, substantially as described, the combination, with the paddle B and its slotted arm $c$ and uprights D D', of the rotating crank C, the fulcrum-pin E, and the fixed washers or flanges $g\ g$ on said crank and fulcrum-pin upon opposite sides of the paddle-arm.

AROBINE C. MITCHELL.

Witnesses:
LUMYRA E. MITCHELL,
WILLIAM MITCHELL.